(12) United States Patent
Formato et al.

(10) Patent No.: US 10,592,355 B2
(45) Date of Patent: *Mar. 17, 2020

(54) CAPACITY MANAGEMENT

(71) Applicant: International Business Machines Corporation, Armonk, NY (US)

(72) Inventors: Marci D. Formato, Clintondale, NY (US); Bernhard J. Klingenberg, Grover Beach, CA (US); Steven M. Reps, Sandy Hook, CT (US); Kurt A. Rybczyk, Waterbury, CT (US); Lisa A. Shepard, Newton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,331

(22) Filed: Nov. 13, 2018

(65) Prior Publication Data
US 2019/0079833 A1 Mar. 14, 2019

Related U.S. Application Data

(63) Continuation of application No. 15/070,092, filed on Mar. 15, 2016, now Pat. No. 10,248,513.

(51) Int. Cl.
*G06F 11/14* (2006.01)
*G06F 3/06* (2006.01)
*H04L 12/26* (2006.01)

(52) U.S. Cl.
CPC ........ *G06F 11/1469* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

| | | | |
|---|---|---|---|
| 6,421,733 B1* | 7/2002 | Tso | H04L 63/0428 709/246 |
| 6,606,744 B1 | 8/2003 | Mikurak | |

(Continued)

OTHER PUBLICATIONS

Appendix P—List of IBM Patents or Patent Applications Treated as Related, Filed herewith, 2 Pages.

*Primary Examiner* — Davoud A Zand
(74) *Attorney, Agent, or Firm* — Brian M. Restauro (57) ABSTRACT

Embodiments of the present invention provide methods, program products, and systems for determining an amount of usable storage in a backup environment. Embodiments of the present invention can be used to receive system information pertaining to a storage backup environment. Embodiments of the present invention can calculate a compression ratio of the storage on a backup server and a backup ratio between an amount of data on a client computer system and an amount of data on the backup server and calculate an average amount of storage consumed on the backup server. Embodiments of the present invention can determine an existing backup capacity for the storage backup environment by identifying an amount representing the actual capacity of data capable of being stored on the backup server and reducing the amount representing the actual capacity according to the calculated average amount of storage consumed on the backup server.

20 Claims, 4 Drawing Sheets

(52) U.S. Cl.
CPC .......... *G06F 3/0619* (2013.01); *G06F 3/0638* (2013.01); *G06F 3/0653* (2013.01); *G06F 11/1451* (2013.01); *G06F 11/1464* (2013.01); *H04L 43/0805* (2013.01); *H04L 43/0817* (2013.01); *G06F 3/065* (2013.01)

(56) References Cited

U.S. PATENT DOCUMENTS

| | | | |
|---|---|---|---|
| 7,124,101 | B1 | 10/2006 | Mikurak |
| 7,330,997 | B1 * | 2/2008 | Odom ................ G06F 11/1464 711/162 |
| 8,321,648 | B2 | 11/2012 | Condict |
| 8,484,356 | B1 | 7/2013 | Douglis et al. |
| 8,566,286 | B1 | 10/2013 | Hawton et al. |
| 8,650,372 | B2 | 2/2014 | Gold et al. |
| 8,935,493 | B1 | 1/2015 | Dolan et al. |
| 9,203,685 | B1 | 12/2015 | Perry et al. |
| 9,383,936 | B1 | 7/2016 | Freitas et al. |
| 9,696,921 | B2 | 7/2017 | Keith, Jr. |
| 2004/0003272 | A1 | 1/2004 | Bantz et al. |
| 2006/0059253 | A1 * | 3/2006 | Goodman ............. G06Q 10/10 709/223 |
| 2006/0212462 | A1 | 9/2006 | Heller et al. |
| 2011/0115223 | A1 | 5/2011 | Stahlkopf et al. |
| 2013/0159255 | A1 | 6/2013 | Kaga et al. |
| 2014/0297742 | A1 | 10/2014 | Lyren |
| 2015/0127340 | A1 * | 5/2015 | Epshteyn ................ G10L 15/26 704/235 |
| 2015/0186407 | A1 * | 7/2015 | Xu ..................... G06F 16/1873 707/638 |
| 2015/0293815 | A1 | 10/2015 | Harel |
| 2015/0363438 | A1 | 12/2015 | Botelho |
| 2015/0373116 | A1 | 12/2015 | Mo et al. |
| 2017/0270010 | A1 | 9/2017 | Formato et al. |

* cited by examiner

CAPACITY MANAGEMENT

BACKGROUND

The present invention relates generally to the field of capacity management, and more particularly, to capacity management in backup and recovery environments.

Backup and recovery systems are often designed to salvage inaccessible data from corrupted or damaged media and/or files when the stored data cannot be accessed in a normal way. Since backup and recovery systems can contain at least one copy of all data considered worth saving, data storage requirements can be significant. In the context of backup and recovery systems, capacity management activities seek to optimize performance and efficiency, and to plan for and justify financial investments of existing data storage structures in these backup and recovery systems. Generally, management activities associated with backup and recovery systems are labor intensive and sometimes inaccurate. For example, capacity management activities can result in misses, gaps, and errors in saved data.

SUMMARY

In one embodiment of the present invention, a computer-implemented method is provided comprising: receiving system information, pertaining to a storage backup environment, wherein the storage backup environment comprises a client computer system and a backup server; calculating a compression ratio of the storage on the backup server and a backup ratio between an amount of data on the client computer system and an amount of data on the backup server; calculating an average amount of storage consumed on the backup server per unit of storage on the client computer system based, at least in part, on the calculated backup ratio and the calculated compression ratio; and determining an existing backup capacity for the storage backup environment by identifying an amount representing the actual capacity of data capable of being stored on the backup server and reducing the amount representing the actual capacity according to the calculated average amount of storage consumed on the backup server which provides solutions for eliminating mistakes in capacity management systems by automatically determining how much data can be added to an already established environment.

In another embodiment of the present invention, the computer-implemented method further includes determining an amount of usable storage by identifying an amount of raw space available for storage and dividing the identified amount of raw space by the average amount of storage consumed on the backup server which provide solutions for determining an accurate amount of storage needed to satisfy an expansion project which can reduce business costs incurred from buying more storage than needed.

In another embodiment of the present invention, a computer program product is provided comprising: one or more computer readable storage media and program instructions stored on the one or more computer readable storage media; program instructions to receive system information, pertaining to a storage backup environment, wherein the storage backup environment comprises a client computer system and a backup server; program instructions to calculate a compression ratio of the storage on the backup server and a backup ratio between an amount of data on the client computer system and an amount of data on the backup server; program instructions to calculate an average amount of storage consumed on the backup server per unit of storage on the client computer system based, at least in part, on the calculated backup ratio and the calculated compression ratio; and program instructions to determine an existing backup capacity for the storage backup environment by identifying an amount representing the actual capacity of data capable of being stored on the backup server and reducing the amount representing the actual capacity according to the calculated average amount of storage consumed on the backup server which provides solutions for eliminating mistakes in capacity management systems by automatically determining how much data can be added to an already established environment.

In another embodiment of the present invention, the computer program product further includes program instructions to determine an amount of usable storage by identifying an amount of raw space available for storage and dividing the identified amount of raw space by the average amount of storage consumed on the backup server which provide solutions for determining an accurate amount of storage needed to satisfy an expansion project which can reduce business costs incurred from buying more storage than needed.

In yet another embodiment of the present invention, a computer system is provided comprising: one or more computer processors, one or more computer readable storage media, and program instructions stored on the one or more computer readable storage media for execution by at least one of the one or more processors. The program instructions comprise program instructions to receive system information, pertaining to a storage backup environment, wherein the storage backup environment comprises a client computer system and a backup server; program instructions to calculate a compression ratio of the storage on the backup server and a backup ratio between an amount of data on the client computer system and an amount of data on the backup server; program instructions to calculate an average amount of storage consumed on the backup server per unit of storage on the client computer system based, at least in part, on the calculated backup ratio and the calculated compression ratio; and program instructions to determine an existing backup capacity for the storage backup environment by identifying an amount representing the actual capacity of data capable of being stored on the backup server and reducing the amount representing the actual capacity according to the calculated average amount of storage consumed on the backup server which provides solutions for eliminating mistakes in capacity management systems by automatically determining how much data can be added to an already established environment.

In yet another embodiment of the present invention, the computer system further includes program instructions to determine an amount of usable storage by identifying an amount of raw space available for storage and dividing the identified amount of raw space by the average amount of storage consumed on the backup server which provide solutions for determining an accurate amount of storage needed to satisfy an expansion project which can reduce business costs incurred from buying more storage than needed.

DETAILED DESCRIPTION

Embodiments of the present invention recognize that capacity management activities are labor intensive and sometimes inaccurate. For example, capacity management activities can result in misses, gaps, and errors. Embodiments of the present invention provide solutions for eliminating these mistakes by automatically determining how much data can be added to an already established environment. In this manner, as described in greater detail later in this specification, embodiments of the present invention can determine how much data is able to be stored in the backup environment based, at least in part, on average data used for backup, target storage compression, and raw free space.

Figure 1:
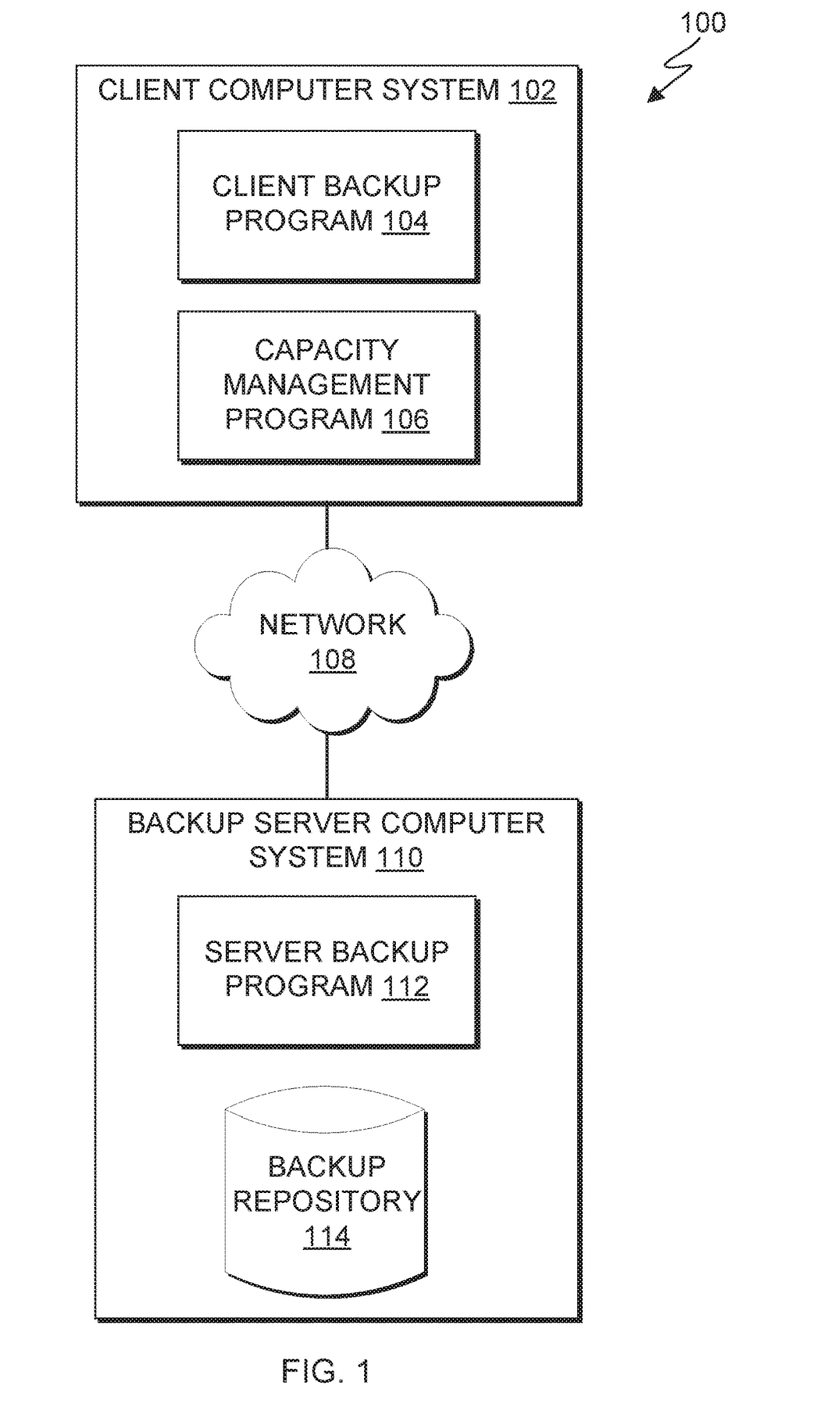
FIG. 1 is a block diagram of a computing environment, in accordance with an embodiment of the present invention.

FIG. 1 is a functional block of computing environment 100, in accordance with an embodiment of the present invention. Computing environment 100 includes client computer system 102 and backup server computer system 110. Client computer system 102 and backup server computer system 110 can be desktop computers, laptop computers, specialized computer servers, or any other computer systems known in the art. In certain embodiments, client computer system 102 and backup server computer system 110 represent computer systems utilizing clustered computers and components to act as a single pool of seamless resources when accessed through network 108. For example, such embodiments may be used in data center, cloud computing, storage area network (SAN), and network attached storage (NAS) applications. In certain embodiments, client computer system 102 and backup server computer system 110 represent virtual machines. In general, client computer system 102 and backup server computer system 110 are representative of any electronic devices, or combination of electronic devices, capable of executing machine-readable program instructions, as described in greater detail with regard to FIG. 4.

Client computer system 102 includes client backup program 104 and capacity management program 106. Client backup program 104 communicates with backup server computer system 110 (e.g., using TCP/IP) to store data (i.e., backup data) from client computer system 102 to backup repository 114. Client backup program 104 can be implemented with any suitable program that is compatible with server backup program 112.

Figure 2:
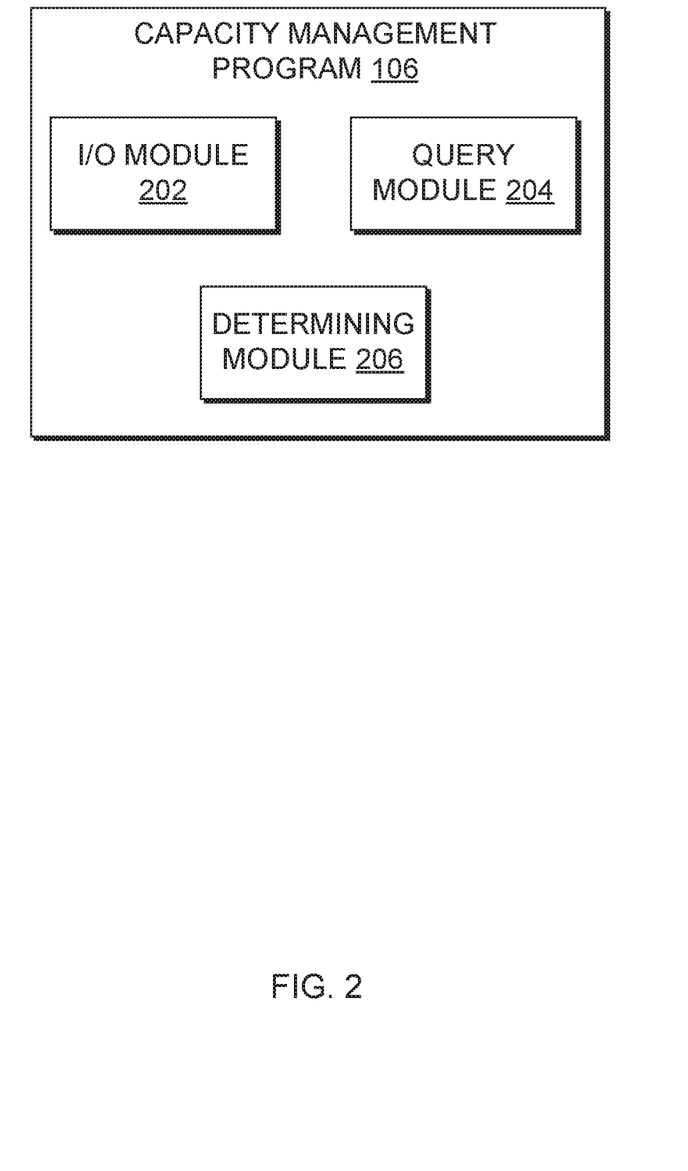
FIG. 2 is a block diagram showing a machine logic (for example, software) portion in accordance with an embodiment of the present invention.
Figure 3:
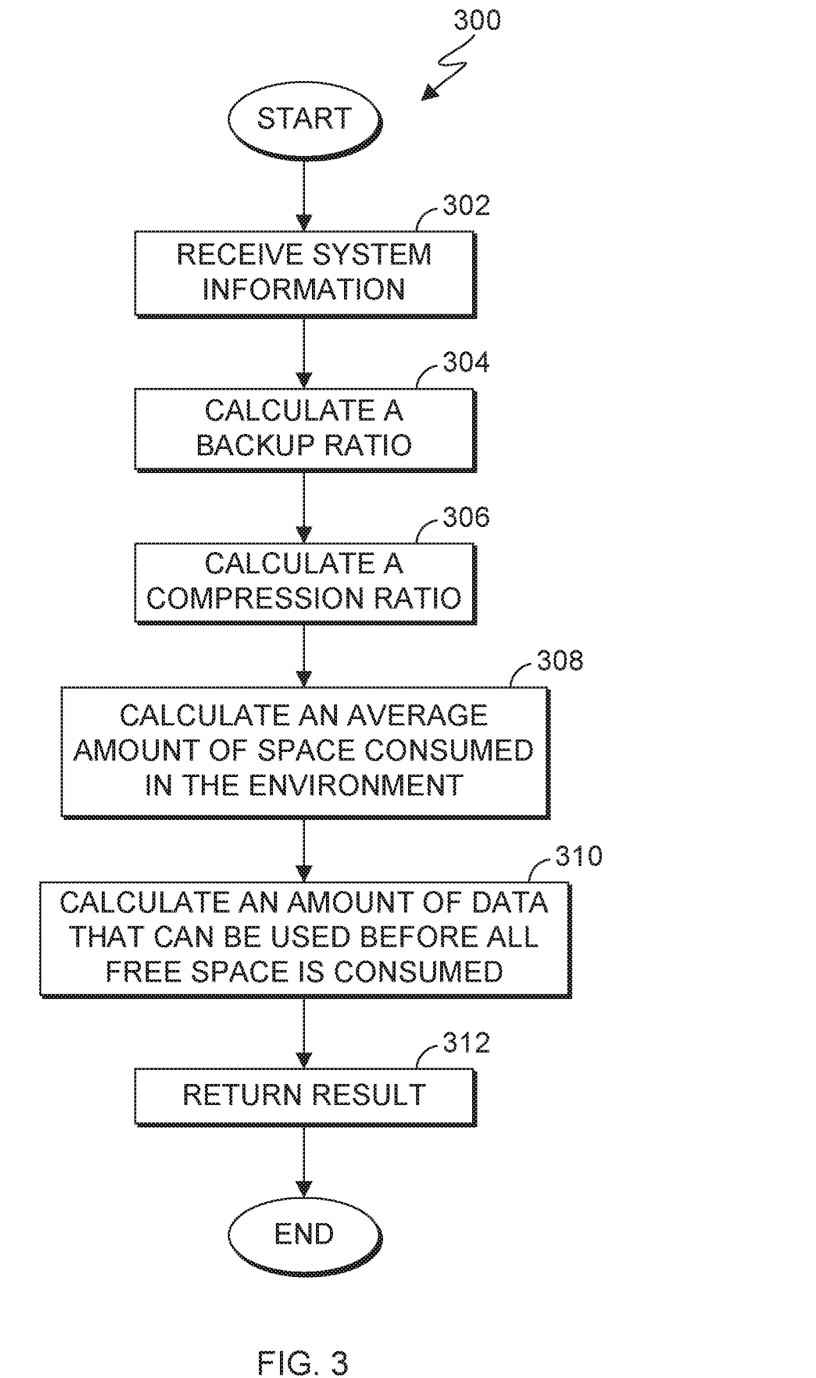
FIG. 3 is a flowchart illustrating operational steps for determining available storage space in a computing environment, in accordance with an embodiment of the present invention.

Capacity management program 106 determines how much data can be added to an existing backup environment (e.g., computing environment 100) based, at least in part, on average data stored, target storage compression, and raw free space, as discussed in greater detail with regard to FIGS. 2 and 3. For example, capacity management program 106 can determine the amount of raw free space and convert the raw free space (i.e., the total amount of storage available before any RAID or File System Overhead is applied) into usable storage amount of storage in an environment. Capacity management program 106 can further provide suggestions based, at least in part, on the determined free space.

In this embodiment, a suggestion can be an amount of free storage on the existing environment (e.g., computing environment 100) before all free space is consumed. In this embodiment, the suggestion can be calculated using the identified raw space divided by an average amount of space consumed in the backup environment, as discussed in greater detail with regard to FIG. 3. For example, capacity management program 106 can determine that there are 25 TB of raw free space and that 2.5 GB is an average amount of space consumed in the backup environment. In other words, for every 1 GB of data stored, 2.5 GB of data is actually consumed by the backup environment, which includes the original 1 GB plus the 1.5 GB worth of backup. Accordingly, the amount of free space left in the environment can be calculated by dividing the raw space (e.g., 25 TB) by the average amount of space consumed in the backup environment (e.g., 2.5 GB) to yield 10 TB of free space.

In other embodiments, a suggestion can be an amount of extra storage needed to satisfy expansion requirements. For example, a user may have a project where the user wants to add 10 terabytes (TB) of server storage. Embodiments of the present invention recognize that a solution to ensure storage is not undersized can be calculated to the size of the desired storage (e.g., 10 TB) multiplied by the retention period. In this example the retention period is 10 versions. Accordingly, a traditional solution would suggest the user to purchase 100 TB of backup storage. Embodiments of this present invention can calculate the ratio of actual server data to data held in backup storage to generate a more accurate suggestion. For example, capacity management program 106 can determine that a user needs only to purchase 50 TB of storage based, at least in part, on the determined available space in the current backup environment.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between client computer system 102 and backup server computer system 110, in accordance with a desired embodiment of the invention.

Backup server computer system 110 includes server backup program 112, and backup repository 114. Server backup program 112 performs server-side backup operations, in accordance with embodiments of the present invention. Server backup program 112 stores received backup objects in backup repository 114. Server backup program 112 can be implemented with any suitable server backup software.

Server backup program 112 also stores system files and information. The term "system files" as used herein, refers to one or more files and/or tables that store system information. For example, a system file can be an occupancy table which holds how much data is stored in a backup server (e.g., backup server computer system 110). Another example of a system file can be a "file system table" which shows how large the filesystem is on each server and how much of the file system is being utilized. In other words, the "file system table" can show how much data is on each server.

Yet another example of a system file can be a "node table". A node table can show what domain the server (e.g., backup server computer system 110) is a member of, which can help identify what type of data, for example, different databases and services such as messaging enterprises is backed up.

A volumes table shows, for a storage system, how many long term volumes are used, how much data each volume can hold, and the percentage used on each. For example, a volume table can help identify either a physical tape or disk storage volume name, the storage pool and device class that it belongs to (e.g., disk or tape), estimated capacity, and the percentage used capacity and its status (e.g., full, filling, etc.). An example volume table is reproduced below:

TABLE 1

Example Volume

000663L5,TAPECOPY,LTOTAPE,3.0 T,11.7,Filling
000742L5,TAPECOPY,LTOTAPE,3.0 T,5.6,Filling
000759L5,TAPECOPY,LTOTAPE,3.0 T,6.0,Filling
000833L5,TAPECOPY,LTOTAPE,3.0 T,6.5,Filling
000869L5,TAPEPOOL,LTOTAPE,1.6 T,85.0,Full
000888L5,TAPEPOOL,LTOTAPE,3.0 T,45.0,Filling Backup repository 114, acts as a storage space in which server backup program 112 stores backup objects and system information. Backup repository 114 can be implemented using any non-volatile storage media known in the art. For example, backup repository 114 can be implemented with a tape library, optical library, one or more independent hard disk drives, or multiple hard disk drives in a redundant array of independent disks (RAID).

Network 108 can be, for example, a local area network (LAN), a wide area network (WAN) such as the Internet, or a combination of the two, and include wired, wireless, or fiber optic connections. In general, network 108 can be any combination of connections and protocols that will support communications between backup server computer system 110, and client computer system 102, in accordance with a desired embodiment of the invention.

It should be understood that, for illustrative purposes, FIG. 1 does not show other computer systems and elements which may be present when implementing embodiments of the present invention. For example, while FIG. 1 shows a single client computer system 102, a single backup server computer system 110, and a single backup repository 114, computing environment 100 can also include additional client computer systems 102, that use backup server computer system 110 to back up their respective data.

FIG. 2 is a block diagram showing a machine logic (for example, software) portion in accordance with an embodiment of the present invention.

As mentioned previously, capacity management program 106 determines how much data can be added to an existing backup environment (e.g., computing environment 100) based, at least in part, on average data stored, target storage compression, and raw free space. Capacity management program 106 includes input/output (I/O) module 202, query module 204, and determining module 206. Input/output module 202 receives inputs from one or more components of computing environment 100 (e.g., from backup server computer system 110) and transmits outputs from determining module 206 to client computer system 102.

Query module 204 queries server backup program 112 for system information. For example, query module 204 can query server backup program 112 for the occupancy table, the file system table and the volumes table. Query module 204 can also query backup server computer system 110 for an amount of free raw space is currently available in backup server computer system 110.

Determining module 206 receives input from query module 204 (e.g., the occupancy table, file system table, node table, volumes table, etc.) and determines a backup ratio. A backup ratio as used herein, refers to a ratio between an amount of storage on client computer system 102 and a corresponding amount of storage held on backup server computer system 110. In this embodiment, determining module 206 determines this by identifying an amount of data that client computer system 102 contains (e.g., 1 GB of data) and identifying an amount of data stored on backup server computer system 110 (e.g., 4 GB). Determining module 206 can then calculate the backup ratio to be 4:1. In other words, for every 1.0 GB on client computer system 102, 4.0 GB is held on backup server computer system 110.

Determining module 206 can further determine the rate of compression for long term storage using the volume tables. In this embodiment, determining module 206 can determine the rate of compression by dividing actual capacity by native capacity. For example, using the storage and volume tables, determining module 206 can identify that the native tape capacity is 1.5 TB. Assuming a compression of 2:1, determining module 206 can identify that there is an available 3.0 TB of storage.

Determining module 206 determines the amount of raw free space in the environment that can be used before all free space is consumed using the identified ratio of storage (e.g., for every one GB on the server, XXGB is held on backup storage), the identified rate of compression for long term storage, and the amount of raw free space, as discussed in greater detail with regard to FIG. 3.

FIG. 3 is a flowchart 300 illustrating operational steps for determining available storage space in a computing environment, in accordance with an embodiment of the present invention.

In step 302, query module 204 receives system information. In this embodiment query module 204 receives system information in response to querying backup server computer system 110 for system information. For example, query module 204 can receive the occupancy table, the file system table, the node table, the volumes table, and amount of free raw space in backup server computer system 110. In other embodiments, query module 204 can receive other system information from one or more other components of computing environment 100.

In step 304, determining module 206 calculates a backup ratio for client computer system 102 and backup server computer system 110. In this embodiment, determining module 206 calculates a backup ratio by identifying an amount of data that client computer system 102 contains (e.g., 1 GB of data) and identifying an amount of data stored on backup server computer system 110 (e.g., 4 GB). Determining module 206 can then calculate the backup ratio to be 4:1. In other words, for every 1.0 GB on client computer system 102, 4.0 GB is held on backup server computer system 110.

In step 306, determining module 206 calculates the rate of compression for long term storage using the received volume tables. In this embodiment, determining module 206 calculates the rate of compression for long term storage based, at least in part, on how many long term volumes are used, how much data each volume can hold, and the percentage used in each long term volume. For example, determining module 206 can determine the rate of compression by dividing actual capacity by native capacity. For example, using the storage and volume tables, determining module 206 can identify that the native tape capacity is 1.5 TB. Assuming a compression of 2:1, determining module 206 can identify that there is an available 3.0 TB of storage.

In step 308, determining module 206 calculates an average amount of space consumed in the environment. In this embodiment, determining module 206 calculates an average amount of space consumed in the environment by using the following formula:

$$\text{Resultant} = \frac{\text{Percent Stored}}{\text{Compression}} \quad \text{Formula 1}$$

Where, the resultant is the calculated average amount of space consumed in the environment; the compression is calculated compression ratio; and the percent stored is derived from the calculated backup ratio. For example, determining module 206 can identify that the backup ratio is 1:5 (i.e., that for every GB on the server, five GB are stored).

For example, determining module 206 can determine that each server is storing 500 GB of data on backup server computer system 110 (i.e., for each GB on the server, five GB are stored), that the average compression for the tapes is 2:1, and that there is 25 TB of raw space. Using the above formula (i.e., Formula 1), the average amount of space consumed in the environment would be 2.5 [e.g., 1*5 (e.g., GB stored)/2 (e.g., the compression ratio)]. This means that for every GB of server data 2.5 GB is required in the backup environment.

In step 310, determining module 206 can calculate an amount of data that can be used before all free space is consumed. In this embodiment, determining module 206 can calculate an amount of data that can be used before all free space is consumed using the following formula:

$$\frac{\text{Raw Space}}{\text{Resultant}} \quad \text{Formula 2}$$

Where raw space is transmitted to determining module 206 in response to a query from query module 204; and the calculated resultant in step 308.

Continuing the above example, the amount of free space that can be used before all free space is consumed can be calculated by dividing the raw space (received as system information in response to a query from query module 204) by the resultant (calculated from formula 1 in step 308). Using Formula 2, the amount of free space can calculated as 10 TB (e.g., 25 TB/2.5 GB).

In step 312, determining module 206 returns results. In this embodiment, determining module 206 returns as a result the calculated amount of space that could be backed up into the environment before all free space is consumed.

In other embodiments, determining module 206 can return as a result a suggestion. For example, where a user needs to determine an amount of extra storage to purchase for expansion, determining module 206 can return, as a result, an accurate amount of extra storage needed to satisfy expansion requirements. For example, a user may have a project where the user wants to add 10 terabytes (TB) of server storage. In this example, the user has specified that the retention period is 10 versions. Accordingly, determining module 206 can calculate and return as a result a suggested amount of extra storage to purchase based, at least in part, on the specified storage and the retention period.

In this embodiment, determining module 206 can return a suggestion for the amount of space needed to be purchased to satisfy an expansion project. In this embodiment, determining module 206 can calculating the amount of space needed by multiplying the server storage by the backup ratio. For example, determining module 206 can identify that the backup ratio is 500% or 5:1 and the server storage is 10 TB. Determining module 206 can calculate the amount of space needed by multiplying the backup ratio (e.g., 5) by the identifying server storage (e.g., 10 TB) to return as a suggestion that only 50 TB of space is needed. Accordingly, a user can purchase the exact amount of required extra storage.

Determining module 206 can convert the amount of free raw space into usable storage. In this embodiment, determining module 206 can convert the amount of free raw space into usable storage by determining the resultant (e.g., by using Formula 1) and determining the amount usable (e.g., by using Formula 2).

Figure 4:
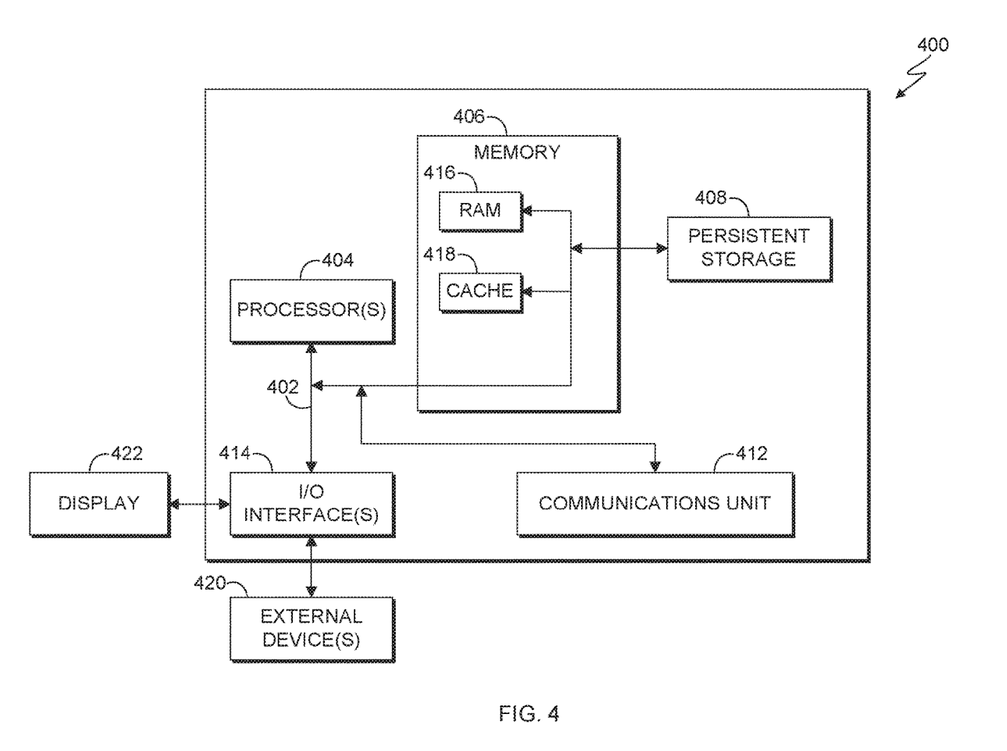
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 108). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining an existing backup capacity for a storage backup environment by identifying an amount representing an actual capacity of data capable of being stored on a backup server of a client computer system; and
   reducing an amount representing the actual capacity according to a calculated average amount of storage consumed on the backup server using a calculated compression ratio of storage on the backup server and a backup ratio between an amount of data on the client computer system and an amount of data on the backup server.

2. The computer-implemented method of claim 1, further comprising:
   determining an amount of usable storage by identifying an amount of raw space available for storage and dividing the identified amount of raw space by the average amount of storage consumed on the backup server.

3. The computer-implemented method of claim 2, further comprising:
   receiving, a total amount of desired storage for an expansion project; and
   returning as a suggestion, an amount of space required to satisfy the expansion project by subtracting the determined amount of usable storage from the total amount of desired storage for the expansion project.

4. The computer-implemented method of claim 1, further comprising:
   receiving system information, pertaining to a storage backup environment, wherein the storage backup environment comprises a client computer system and a backup server;
   calculating a compression ratio of the storage on the backup server and a backup ratio between an amount of data on the client computer system and an amount of data on the backup server; and
   calculating an average amount of storage consumed on the backup server per unit of storage on the client computer system based, at least in part, on the calculated backup ratio and the calculated compression ratio.

5. The computer-implemented method of claim 4, wherein calculating a backup ratio comprises dividing the amount of data on the client computer system by the amount of data on the backup server.

6. The computer-implemented method of claim 4, wherein calculating a compression ratio comprises:
   dividing the amount of data on the backup server by an original amount of data on the backup server prior to compression.

7. The computer-implemented method of claim 4, wherein calculating an average amount of space comprises dividing the amount of storage on the backup server by the compression ratio.

8. A computer program product comprising:
   one or more computer readable storage media and program instructions stored on the one or more computer readable storage media, the program instructions comprising:
   program instructions to determine an existing backup capacity for a storage backup environment by identifying an amount representing an actual capacity of data capable of being stored on a backup server of a client computer system; and
   program instructions to reduce an amount representing the actual capacity according to a calculated average amount of storage consumed on the backup server using a calculated compression ratio of storage on the backup server and a backup ratio between an amount of data on the client computer system and an amount of data on the backup server.

9. The computer program product of claim 8, wherein the program instructions stored on the computer readable storage media further comprise:
   program instructions to determine an amount of usable storage by identifying an amount of raw space available for storage and dividing the identified amount of raw space by the average amount of storage consumed on the backup server.

10. The computer program product of claim 9, wherein the program instructions stored on the computer readable storage media further comprise:
    program instructions to receive, a total amount of desired storage for an expansion project; and
    program instructions to return as a suggestion, an amount of space required to satisfy the expansion project by subtracting the determined amount of usable storage from the total amount of desired storage for the expansion project.

11. The computer program product of claim 8, wherein the program instructions stored on the computer readable storage media further comprise:
    program instructions to receive system information, pertaining to a storage backup environment, wherein the storage backup environment comprises a client computer system and a backup server;

program instructions to calculate a compression ratio of the storage on the backup server and a backup ratio between an amount of data on the client computer system and an amount of data on the backup server; and program instructions to calculate an average amount of storage consumed on the backup server per unit of storage on the client computer system based, at least in part, on the calculated backup ratio and the calculated compression ratio.

12. The computer program product of claim 11, wherein the program instructions to calculate a backup ratio comprise program instructions to divide the amount of data on the client computer system by the amount of data on the backup server.

13. The computer program product of claim 11, wherein the program instructions to calculating a compression ratio comprise:

program instructions to divide the amount of data on the backup server by an original amount of data on the backup server prior to compression.

14. The computer program product of claim 11, wherein the program instructions to calculate an average amount of space comprise program instructions to divide the amount of storage on the backup server by the compression ratio.

15. A computer system comprising:

one or more computer processors;

one or more computer readable storage media; and program instructions stored on the one or more computer readable storage media for execution by at least one of the one or more computer processors, the program instructions comprising:

program instructions to determine an existing backup capacity for a storage backup environment by identifying an amount representing an actual capacity of data capable of being stored on a backup server of a client computer system; and program instructions to reduce an amount representing the actual capacity according to a calculated average amount of storage consumed on the backup server using a calculated compression ratio of storage on the backup server and a backup ratio between an amount of data on the client computer system and an amount of data on the backup server.

16. The computer program product of claim 15, wherein the program instructions stored on the computer readable storage media further comprise:

program instructions to determine an amount of usable storage by identifying an amount of raw space available for storage and dividing the identified amount of raw space by the average amount of storage consumed on the backup server.

17. The computer program product of claim 16, wherein the program instructions stored on the computer readable storage media further comprise:

program instructions to receive, a total amount of desired storage for an expansion project; and program instructions to return as a suggestion, an amount of space required to satisfy the expansion project by subtracting the determined amount of usable storage from the total amount of desired storage for the expansion project.

18. The computer program product of claim 15, wherein the program instructions stored on the computer readable storage media further comprise:

program instructions to receive system information, pertaining to a storage backup environment, wherein the storage backup environment comprises a client computer system and a backup server;

program instructions to calculate a compression ratio of the storage on the backup server and a backup ratio between an amount of data on the client computer system and an amount of data on the backup server; and program instructions to calculate an average amount of storage consumed on the backup server per unit of storage on the client computer system based, at least in part, on the calculated backup ratio and the calculated compression ratio.

19. The computer program product of claim 18, wherein the program instructions to calculate a backup ratio comprise program instructions to divide the amount of data on the client computer system by the amount of data on the backup server.

20. The computer program product of claim 18, wherein the program instructions to calculating a compression ratio comprise:

program instructions to divide the amount of data on the backup server by an original amount of data on the backup server prior to compression.

* * * * *